(12) United States Patent
Cubley et al.

(10) Patent No.: US 7,071,883 B2
(45) Date of Patent: Jul. 4, 2006

(54) SET-TOP BOX HAVING AN IMPROVED PATCH ANTENNA

(75) Inventors: H. Dean Cubley, Houston, TX (US); Richard C. Liu, Sugar Land, TX (US)

(73) Assignee: Eagle Broadband, Inc., Houston, TX (US)

( * ) Notice: Subject to any disclaimer, the term of this patent is extended or adjusted under 35 U.S.C. 154(b) by 954 days.

(21) Appl. No.: 09/903,242

(22) Filed: Jul. 11, 2001

(65) Prior Publication Data

US 2003/0028902 A1 Feb. 6, 2003

(51) Int. Cl.
*H01Q 1/24* (2006.01)
(52) U.S. Cl. ............................ 343/702; 343/700 MS
(58) Field of Classification Search ......... 343/700 MS, 343/702, 846
See application file for complete search history.

(56) References Cited

U.S. PATENT DOCUMENTS

| | | | | |
|---|---|---|---|---|
| 5,111,211 A | | 5/1992 | Dahlberg | 343/700 |
| 5,594,455 A | * | 1/1997 | Hori et al. | 343/700 MS |
| 5,977,710 A | | 11/1999 | Kuramoto et al. | 313/700 |
| 6,023,241 A | | 2/2000 | Clapper | 342/357.13 |
| 6,028,764 A | | 2/2000 | Richardson et al. | 361/681 |
| 6,061,025 A | | 5/2000 | Jackson et al. | 343/700 |
| 6,069,588 A | | 5/2000 | O'Neill, Jr. | 343/713 |
| 6,795,688 B1 | * | 9/2004 | Plasson et al. | 455/41.2 |
| 2002/0194621 A1 | * | 12/2002 | Tran et al. | 725/139 |

OTHER PUBLICATIONS

*Microstrip Antennas,* Robert E. Munson; *Antenna Engineering Handbook,* 3rd Edition, Chapter 7, 1993, (32 p.).

* cited by examiner

*Primary Examiner*—Shih-Chao Chen
(74) *Attorney, Agent, or Firm*—Conley Rose, P.C.

(57) ABSTRACT

A set top box is provided with a patch antenna to wirelessly communicate with other devices. In one embodiment, the set top box has a metallic enclosure with a non-metallic bezel covering the front of the device. A communication circuit board with an imprinted patch antenna is located in the interstitial space between the metallic enclosure and the non-metallic bezel. The communications board preferably comprises a thin (0.06 inch) FR-4 circuit board with etched copper cladding. The patch antenna preferably comprises a ground plane on one side of the circuit board, and a rectangular patch on the opposite side of the circuit board. The patch is side-fed by a microstrip feed. The dimensions of the antenna are selected to optimize the antennas performance in frequency range between 2.400 and 2.483 GHz when located in the above-described interstitial space.

9 Claims, 6 Drawing Sheets

SET-TOP BOX HAVING AN IMPROVED PATCH ANTENNA

CROSS-REFERENCE TO RELATED APPLICATIONS

This application relates to U.S. Patent Application Ser. No. 09/685,506, entitled "Patch Antenna for a Set Top Box", filed Oct. 10, 2000, which is now abandoned. This application is hereby incorporated herein by reference.

BACKGROUND OF THE INVENTION

1. Field of the Invention

The present invention generally relates to a set-top box having an improved patch antenna. More particularly, the invention relates to a set-top box having an antenna provided on a front panel circuit board.

2. Background of the Invention

As consumers acquire more electronic devices they continually look for ways to integrate them into a single multifunctional system providing them with an efficient single point of control. Generally a single device lies at the nexus of an integrated system allowing each of the components to interface. One such device for allowing this kind of interfacing is known as a "set top box." Typically, a set top box connects to a television set and interfaces various media such as cable television broadcasts, satellite signals, stereo components, internet connections via a telephone line, DVD and VCR devices, and other types of electronics and communication media.

Although a system, such as a set top box, in which multiple devices are interconnected furnishes a method of control, such devices have certain disadvantages. For instance, such systems traditionally require a large number of electrical cables to interface to the set top box. Cables can be expensive and are generally cumbersome, unattractive, and often limited to small areas unless one is willing to run cables throughout the home or office. In addition, the set top box must be designed to receive the vast array of connectors that may be found on the various media. One way of overcoming these disadvantages is to have a wireless system.

One wireless protocol gaining popularity is "Bluetooth" technology which has been developed as an open standard for wireless communication of both data and voice. It is based on a relatively low-cost, short-range radio frequency ("RF") link facilitating protected ad hoc connections for stationary and mobile communication environments. Bluetooth provides a universal bridge to existing data networks, a peripheral interface, and a mechanism to form small private ad hoc groupings of connected devices away from fixed network infrastructures. It enables users to connect a wide range of computing and telecommunication devices easily and simply, without the need to buy, carry or connect cables. Bluetooth also offers a more reliable wireless link than traditional protocols due to its fast acknowledgement and frequency hopping scheme. Because Bluetooth typically hops faster and uses shorter packets of data than other systems, it works with much less interference from other signals in "noisy" environments.

Some of the characteristics of the Bluetooth technology include: operation in the unlicensed Industrial-Scientific-Medical ("ISM") band of 2.4 GHz; a Frequency Hop ("FH") transceiver which divides the band into a number of hop channels and allows a connection to hop from one channel to another in a pseudo-random fashion during use; support for up to eight devices in a piconet (two or more Bluetooth units sharing a channel); built in security; non line-of-sight transmission through walls and certain types of cases; it is traditionally omni-directional; and supports both isochronous and asynchronous services; such as easy integration of TCP/IP for networking. Bluetooth was developed primarily to support computer networks.

Wireless communication systems generally require antennas to receive and transmit the information. A variety of antenna designs exist and it is not a trivial task to design a suitable antenna for a given application. There are a number of problems that must be addressed when choosing an appropriate antenna type and designing the particular antenna configuration. Such design considerations include the desired frequency range, size and shape of the pattern of coverage of the antenna, and other issues. The performance of many types of antennas is effected by metal surfaces located in close proximity to the antenna. Such metal surfaces can, to a certain extent, short circuit the antenna rendering it useless or at least significantly decreasing its performance. Antennas generally should not be placed inside a metal enclosure because the enclosure will shield the antenna thereby precluding the antenna to transmit a signal to the outside of the enclosure and precluding exterior-generated signals from penetrating the enclosure to be received by the antenna. Further, if placed outside the metal enclosure, it is still important for the enclosure not to interfere with the antenna's transmission and reception capability.

The present invention addresses the problem of designing an antenna system for a device with a metal enclosure (e.g., a set top box). Such an antenna design must address several problems. First, the location of the antenna should not be inside the metal enclosure because of the problem noted above. Second, if the antenna is placed on the outside of, but close to, the metal enclosure, the metal enclosure may still detrimentally interfere with the antenna's performance. Third, it is usually preferably for the owner of the device not to have to concern himself or herself with the placement and orientation of an antenna. Accordingly, a solution to these problems is needed.

One such solution is described in related U.S. patent application Ser. No. 09/685,506, which was incorporated by reference above. The patch antenna described therein, however, is unsuitable for use on a thin FR-4 circuit board. Ongoing efforts to reduce device size make it desirable to use this thinner circuit board material. Accordingly, a new patch antenna design is needed.

BRIEF SUMMARY OF THE INVENTION

The problems noted above are solved in large part by a set top box that uses a patch antenna to wirelessly communicate with other devices. In one embodiment, the set top box has a metallic enclosure with a non-metallic bezel covering the front of the device. A communication circuit board with an imprinted patch antenna is located in the interstitial space between the metallic enclosure and the non-metallic bezel. The communications board preferably comprises a thin (0.06 inch) FR-4 circuit board with etched copper cladding. The patch antenna preferably comprises a ground plane on one side of the circuit board, and a rectangular patch on the opposite side of the circuit board. The patch is side-fed by a microstrip feed. The dimensions of the antenna are selected to optimize the antennas performance in frequency range between 2.400 and 2.483 GHz when located in the above-described interstitial space.

Using a patch antenna as the set top box's antenna advantageously solves the problem of interference that would result from the metal enclosure if other types of antennas were used. Using a patch antenna and locating the patch antenna behind the bezel hides the antenna from the user's reach, thereby advantageously avoids the user from having to carefully place or adjust the antenna. Further, the patch antenna is optimized for use in a multi-dielectric constant environment. In addition, the choice of antenna (patch) and its orientation outside the metal enclosure reduces or eliminates interfering effects from the enclosure. These and other advantages will become apparent upon reviewing the following description and drawings.

BRIEF DESCRIPTION OF THE DRAWINGS

For a detailed description of the preferred embodiments of the invention, reference will now be made to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The following description describes the preferred embodiment of the invention in the context of a set top box. However, it should be noted that the antenna design shown below is not limited to just set top box technology.

Figure 1:
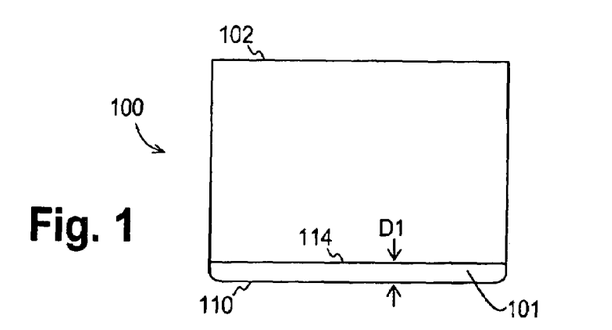
FIG. 1 shows a top view of the set-top box of the preferred embodiment.

Referring now to FIG. 1, set top box 100 (shown in top view) as constructed in accordance with the preferred embodiment generally includes an enclosure 102 and a front bezel member 110. The set top box 100 may serve as not only a point of control for other devices as noted above, but may also serve as a host for other home entertainment components. The front bezel 110 defines an interstitial space 101 between the bezel and the front face 114 of enclosure 102. A distance D1 separates the bezel 110 from the front face 114. Various control components discussed below with respect to FIGS. 2–7 are located within interstitial space 101. Enclosure 102 in the preferred embodiment is manufactured from metal, preferably bent sheet aluminum, to shield electronics (not specifically shown in FIG. 1) contained therein. However, it will be understood that the enclosure may also be constructed of other materials such as alloys, composites, or polymer-based materials, provided the internal electronics are adequately shielded. The bezel 110 preferably is constructed of plastic, or other material through which RF energy can propagate.

It is contemplated that the set top box 100 may be placed by the user in a confined space such as in a living room cabinet near a television set or on top of the television set. For obvious reasons, it is desirable for the set top box 100 to be as small and inconspicuous as possible. To that end, the distance D1 between the front metal face 114 of enclosure 102 and the plastic bezel 110 is as short as possible.

Figure 5:
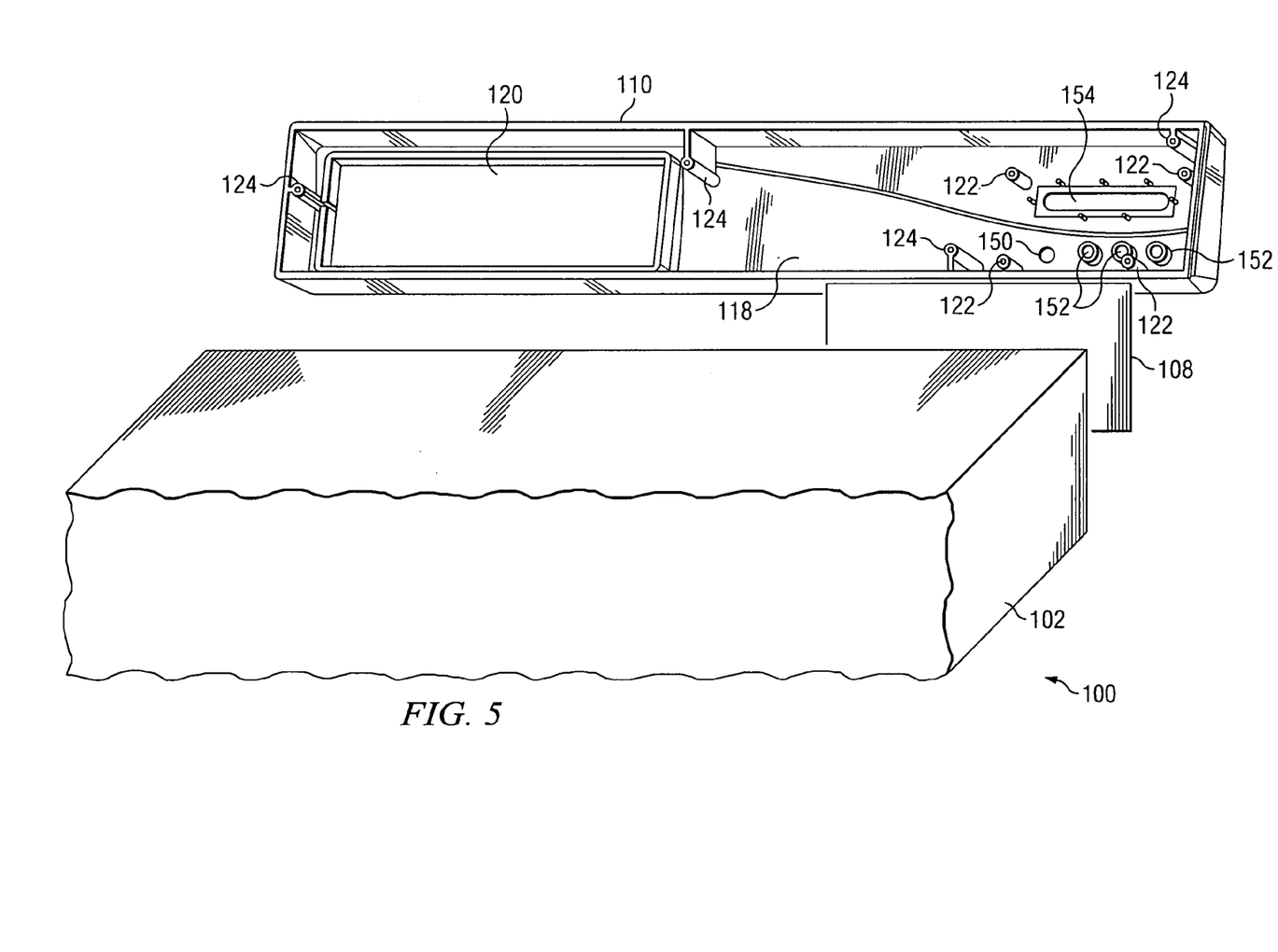
FIG. 5 shows an exploded perspective rear view of the set top box of FIG. 1.

Of concern to the subject matter of this disclosure is where to locate an antenna (not shown in FIG. 1) to provide the set top box a wireless communication capability. In accordance with the preferred embodiment, the antenna preferably is located on a circuit board in interstitial space 101 between the metal enclosure 102 and the plastic bezel 110, as shown in FIG. 5 which will be discussed in more detail below. This location for the antenna solves several of the problems noted above. Because the antenna is "hidden" by the bezel, the user of the set top box need not install, adjust or otherwise concern himself or herself with the antenna. In fact, the user need not even know the set top box 100 has an antenna. Further, locating the antenna outside the metal enclosure 102 avoids the shielding problem noted above that would result if the antenna was located inside the enclosure.

Locating the antenna in the interstitial space 101, however, creates several problems in designing the antenna that must be addressed. First, because distance D1 preferably is as short as possible, the performance of many types of antennas would be detrimentally effected by the front metal face 114 of the enclosure 102 which will necessarily be close to the antenna wherever it is located in interstitial space 101. The metal surface 114 would tend to short any such antenna located less than about one wave length from the metal surface. At the Bluetooth frequency of 2.4 GHz, one wave length is approximately 5 inches. Preferably, however, distance D1 is substantially less than 5 inches. Further, the plastic bezel 110 has a dielectric constant that is different than the air which preferably fills the interstitial space 101. An antenna's performance can be detrimentally effected by a multi-dielectric constant environment. The preferred embodiment of the present invention solves these problems by using patch antenna, locating the patch antenna in the interstitial space 101 and optimizing the patch antenna to accommodate the multi-dielectric environment in which the antenna must function.

Figure 2:
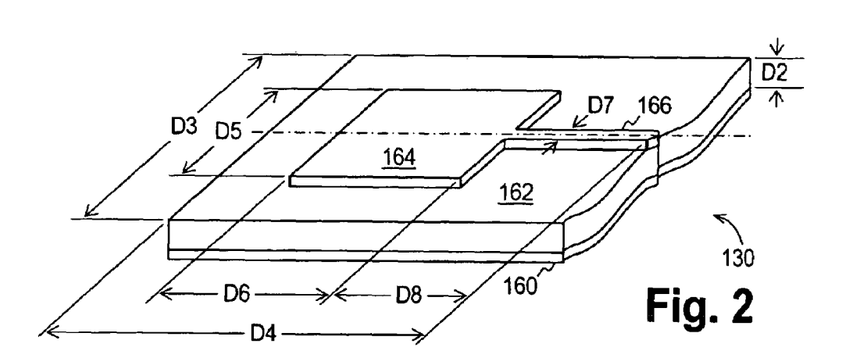
FIG. 2 shows a preferred embodiment of a patch antenna in accordance with the present invention.

FIG. 2 shows a preferred embodiment of a patch antenna 130. As shown, patch antenna 130 preferably includes a dielectric spacer 162 sandwiched between a ground plane 160 and a conducting patch 164. The dielectric spacer 162 is preferably provided in the form of an FR-4 circuit board, which has a thickness D2 of 0.06 inches. The dielectric spacer 162 preferably maintains the patch 164 spaced from and parallel to ground plane 160. Feed 166 is electrically insulated from ground plane 160 and feeds RF energy to the patch 164. Although the patch 164 is shown substantially as square in FIG. 2, it should be recognized that the patch can be of other shapes such as, without limitation, rectangular and circular.

In a preferred embodiment, the patch antenna is located in a region of minimum dimension D3×D4. The ground plane 160 underlies the whole region. A rectangular patch 164 is preferably placed symmetrically with respect to a central axis of the region, where the central axis runs parallel to the D4 dimension. The patch 164 is preferably of dimension D5×D6, with the D5 dimension perpendicular to the central axis, and the D6 dimension parallel to the central axis. In this embodiment of a patch antenna, the antenna 130 is "side fed" meaning that the feed point is on a side of the antenna. The patch is preferably driven by a feed 166 running along the axis to one side of the patch 164. The feed preferably has a width D7 and a minimum length D8.

The preferred dimensions of D2 though D8 are given below in inches. The tolerance is +/−10%. Other dimensions are also possible.

| D2 | 0.06  | D6 | 1.164 |
|----|-------|----|-------|
| D3 | 1.875 | D7 | 0.07  |
| D4 | 2.25  | D8 | 0.625 |
| D5 | 1.5   |    |       |

Preferably, the ground plane 160 and the conducting patch 164 both are made out of copper cladding. Preferably, the thickness of each copper cladding comprising the ground plane 160 and the conducting patch 164 is approximately 1.44 mils+/−10%. Thus, given D2 as indicated above, the total thickness of patch antenna 200 is approximately 63 mils. The dielectric constant of the dielectric spacer is approximately 4.3. If the enclosure is metallic, the patch antenna is preferably mounted with the ground plane flush against the enclosure, or with the ground plane approximately one-quarter wavelength (1.23 inches in free space) away from the enclosure. One advantage of patch antenna 130 is that the bezel 110 can accommnodate the antenna at any distance from the inside surface of the bezel, such as less than 0.5 inches. As such, the depth of the interstitial space 101 can be kept as small as possible.

Figure 3:
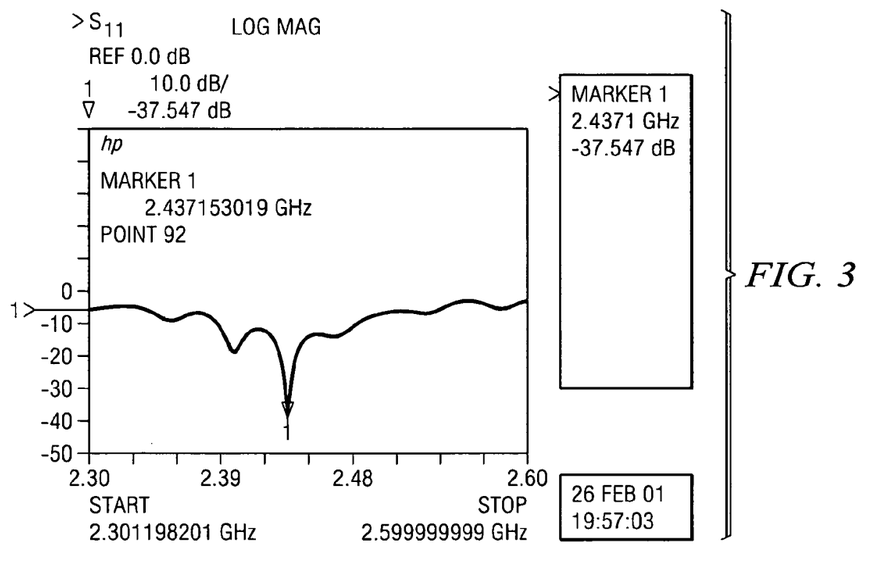
FIG. 3 is a reflectance graph that shows the bandwidth of the preferred patch antenna embodiment.

FIG. 3 shows the reflectance of the preferred embodiment of the patch antenna as a function of excitation frequency. The operating bandwidth of the antenna is the region where the reflectance is below −10 dB, which is the range between 2.390 and 2.483 GHz. The center frequency is 2.437 GHz. This antenna emits and receives linearly polarized signals, with an average gain of about 2 dBi. The radiation pattern is approximately semispherical with small backlobes.

Figure 4:
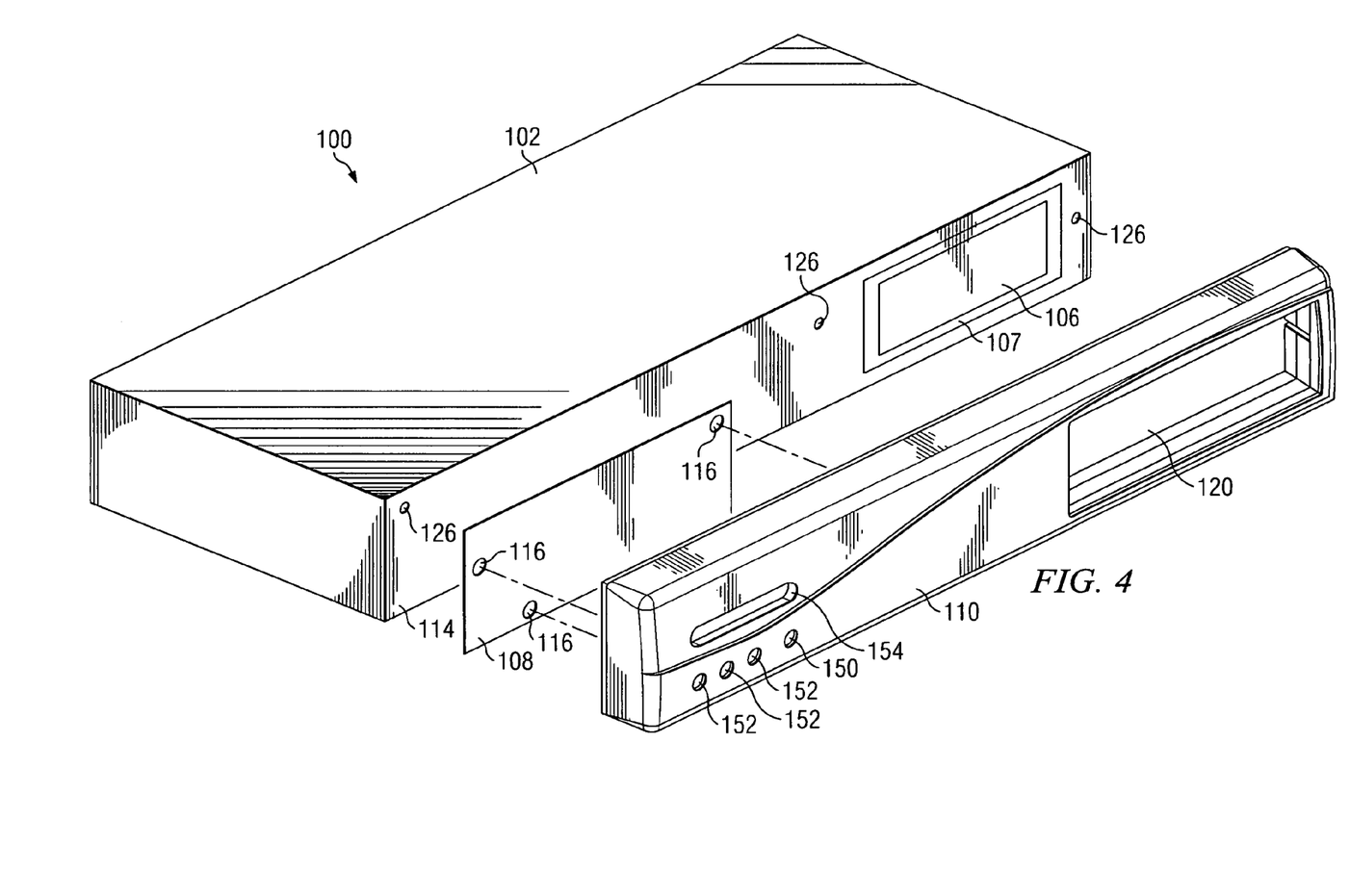
FIG. 4 shows an exploded perspective front view of the set top box of FIG. 1.

Referring now to FIGS. 4 and 5, set top box 100 preferably comprises the enclosure 102 as discussed above, an electronic package (not specifically shown) internal to enclosure 102, an audio/video storage device 106 (e.g., a DVD drive), a communication circuit board 108, and the front bezel 110. The particular configuration for bezel 110 shown in FIG. 4 is exemplary only and numerous other configurations are possible. The internal electronics of the set top preferably include any suitable electronic components such as a microprocessor, memory and other well known components. Audio/video storage device 106 preferably includes a DVD/CD-ROM and is oriented so as to be accessible through an opening 107 in the front face 114 of enclosure 102 and through an opening 120 in bezel 110.

The front bezel 110 preferably is mounted to the front face 114 of enclosure 102 via a plurality of tubular standoffs 124 (best shown in FIG. 5) oriented substantially perpendicular to the vertical inner face 118 of the front bezel 110. The tubular standoffs 124 in the preferred embodiment have a bore hole for receiving a screw, dowel, pin, rivet or other fastening mechanism. The bore hole in the standoffs may be threaded depending on the type of corresponding fastening mechanism. The tubular standoffs 124 being oriented such that alignment is achieved with corresponding openings 126 in the front face 114 of enclosure 102. Preferably, the bezel 110 can be removed if desired. Alternatively, the tubular standoffs 124 receive fasteners that are either permanently fixed or integrated with the front face 114 or semi-permanently fixed through the aligned openings 126 of enclosure 102.

The front bezel 110 preferably contains a power switch aperture 150 and light emitting diode ("LED") apertures 152. Power switch aperture 150 permits a user to press a button to power on and off the set top box 100. The LED apertures 152 permit LEDs (FIGS. 6 and 7) to provide visible communication to the viewer of operational status and function of the set top box 100. Accordingly, apertures 150 and 152 are oriented such that they are in alignment with a corresponding power switch and LEDs mounted on communication board 108. Aperture 154 is a window allowing infra-red ("IR") communication between an infra-red input device (not shown) such as a remote control and an IR sensitive receiving device on communication board 108. In the preferred embodiment an infra-red keyboard (not shown) may be used as the central controller for the set top box 100. Such a keyboard allows control of all wirelessly coupled peripherals within the signal range of the set top box 100.

Figure 6:
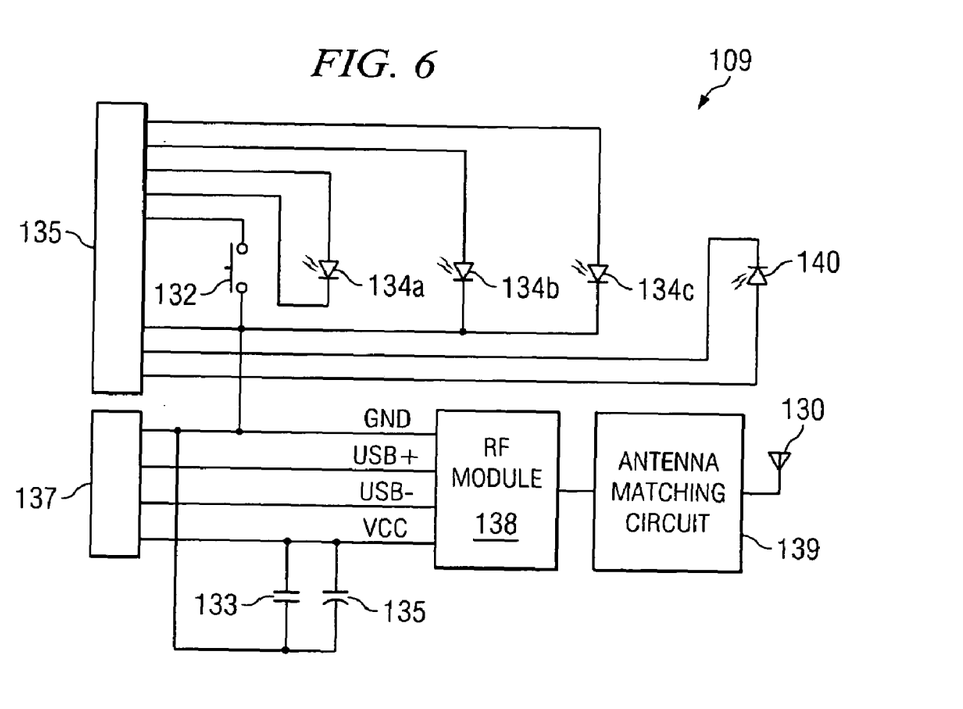
FIG. 6 shows a schematic diagram of one embodiment of a communication circuit used in the set top box of FIG. 1.

Referring now to FIG. 6, the communication circuit board 108 preferably includes circuitry 109 that permits the set top box 100 to communicate wirelessly with other device such as speakers, computers, telephones, etc. As shown in FIG. 6, the communication circuit board 108 preferably includes a power switch 132, LEDs 134a, 134b and 134c, photodiode 140, an RF module 138, an antenna matching circuit 139, patch antenna 130 and high frequency and low frequency decoupling capacitors 133 and 135. Connectors 135 and 137 permit circuit 109 to be connected to circuitry internal to the enclosure 102.

The enclosure's internal circuitry drives current through LEDs 134a–134c to indicate the status of the unit. LED 134a preferably indicates reception of IR energy from the wireless keyboard. LED 134b preferably indicates whether power is on or off and LED 134c indicates whether the unit is in a standby mode. Photodiode 140 is sensitive to IR energy and generates current when illuminated by the wireless keyboard.

The RF module 138 is any suitable module such as the ROK 10100711 Bluetooth module by Ericsson. Antenna 130 preferably is a patch antenna, such as that shown in FIG. 2, or any other type of antenna that can operate effectively within the confines of the interstitial space 101 (FIG. 1). Antenna matching circuit 139 couples the RF module 138 to the antenna 130 and includes known circuitry to match the impedance of the antenna to the rest of the system. If the RF module 138 has a 50 ohm impedance, the antenna matching circuit 139 may not be needed. The matching circuit 139 may simply be a quarter-wave trace in the 50 ohm system, as one of ordinary skill would know.

The RF module 138 preferably receives RF signals detected by antenna 130 and converts those signals to a format compatible with the universal serial bus ("USB") standard and provides USB data on its USB+ and USB− pins through connector 137 to the set top box's internal circuitry. Conversely, the RF module 138 converts USB data from the box's internal circuitry to a format suitable to drive the patch antenna 130. As such, the set top box 100 can transmit as well as receive information.

Figure 7:
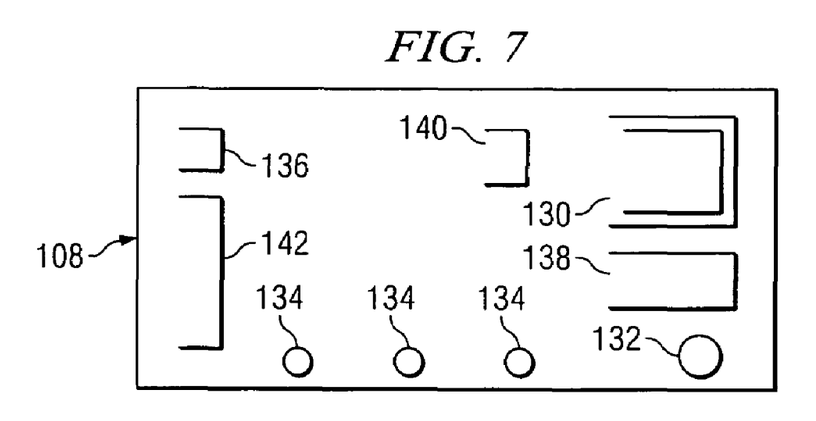
FIG. 7 shows a board layout of the communication circuit of FIG. 4.

FIG. 7 shows a preferred component layout for communication board 108. The power switch 132, LEDs 134 and photodiode 140 preferably are positioned on the board 108 so that they align with their corresponding apertures 150, 152 and 154 (FIG. 4) when board 108 is attached to bezel 110. FIG. 7 also shows patch antenna 130 constructed as part of communication board 108.

Referring again to FIGS. 4 and 5, the communication circuit board 108 preferably is located external of enclosure 102 but adjacent to the front face 114 and within the interstitial space 101 created by the combination of face 114 and the front bezel 110. As shown in FIG. 5, the circuit board 108 is mounted to the front bezel 110 preferably via a plurality of tubular standoffs 122 oriented substantially perpendicular to the vertical inner face 118 of the front bezel 110. The tubular standoffs 122 in the preferred embodiment have a bore hole for receiving a screw, dowel, pin, rivet or other fastening mechanism. The tubular standoffs 122 are oriented such that alignment is achieved with corresponding openings 116 in the circuit board 108.

In this preferred orientation the ground plane 162 advantageously prevents signal interference with respect to signals originating from behind the vertical plane of the front face 114 of the set top box 100. In addition, the metallic enclosure 102 provides increased shielding from such interference. The field of reception of the antenna is preferred in that it can target the typical arrangement of home entertainment equipment which generally are located in the same room as the set top box. In particular, the antenna is most sensitive to communications to or from devices in front of the set top box 100 and is essentially incapable of receiving signals from behind the set top box. Preferably, the patch antenna is designed to have a uni-directional pickup pattern to substantially reject any near-field interference generated by the set top box itself.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A set-top box comprising:
 a metallic enclosure having a front face;
 a non-metallic bezel attached to the front face of the enclosure and defining an interstitial space between the front face and the bezel; and
 a communications board located in said interstitial space, wherein the communications board includes:
  an FR-4 circuit board having a thickness of 0.06±10% inches; and
  a side-fed patch antenna having the circuit board as a dielectric spacer.

2. The set-top box of claim 1, wherein the patch antenna further includes:
 a ground plane on a first side of the circuit board, wherein the ground plane has a width of at least 1.875±10% inches and a length of at least 2.25±10% inches;
 a rectangular patch on a second side of the circuit board opposite the first side, wherein the patch has a width of 1.5±10% inches and a length of 1.164±10% inches; and
 a feed connected to a side of the patch halfway along the width, wherein the feed has a width of 0.07±10% inches and a length of at least 0.625±10% inches.

3. The set-top box of claim 1, wherein the patch antenna is configured to operate between 2.400 and 2.483 GHz.

4. The set-top box of claim 2, wherein the patch and feed comprise copper cladding having a thickness of approximately 0.063 inches.

5. The set-top box of claim 1, further comprising:
 a radio-frequency ("RF") module coupled to the patch antenna and configured to convert signals between baseband and an operating frequency range of the patch antenna.

6. The set-top box of claim 5, further comprising:
 a USB bus interface coupled to the RF module; and
 a USB bus that couples the USB bus interface to electronic circuitry in said metallic enclosure.

7. The set-top box of claim 1, wherein the communications board is mounted flush against the front face of the metallic enclosure.

8. The set-top box of claim 1, wherein the communications board is mounted about 1.23 inches from the front face of the metallic enclosure.

9. The set-top box of claim 1, wherein the patch antenna is less than about 0.5 inches from the bezel.

* * * * *